Patented Feb. 20, 1945

2,369,951

UNITED STATES PATENT OFFICE 2,369,951

PROCESS FOR PREPARING ANTHRAQUINONE VAT DYES

William Dettwyler, Pitman, and Frederic B. Stilmar, Woodstown, N. J., assignors to E. I. du Pont de Nemours & Company, Wilmington, Del., a corporation of Delaware No Drawing. Application November 20, 1942, Serial No. 466,336

3 Claims. (Cl. 260—316)

This invention relates to improvements in the process for preparing anthraquinone vat dyes, and more particularly, to an improved process for preparing dyes of the anthrimide-carbazole series.

The early methods disclosed for the ring closure of alpha-alpha-trianthrimides to what is generally considered to be carbazoles, involve what is usually referred to as a "dry fusion" with aluminum chloride. The anthrimide is fused with aluminum chloride or with a mixture of aluminum chloride and sodium chloride at temperatures of around 200° C. or above to cause the ring closure which converts the anthrimide, that is not a vat dyestuff, into a vat dye which gives a soluble hydrosulfite vat that has an affinity for cotton fibers. The aluminum chloride fusion of 1,5-trianthrimide at temperatures of around 200° C., however, gives very low yields of color, and a similar fusion of the closely related 1,4-trianthrimide results in a product of no commercial value. While many substituted anthrimides have been found to ring close with aluminum chloride in nitrobenzene or similar solvents, the unsubstituted trianthrimides cannot be ring closed by this method and therefore the brown dyestuff, that was early known to be obtainable in very small although negligible quantities from the 1,4-trianthrimides, was finally produced by ring closure of the 1,4-trianthrimide with aluminum chloride in pyridine, as described in U. S. Patent 1,690,236. This process, however, involves the use of a solvent that adds materially to the cost of the process, and from which the final dyestuff must be separated by steam distillation or solvent purification methods.

It is, therefore, an object of this invention to provide a simple and economical process for effecting ring closure of the 1,5-trianthrimide and the 1,4-trianthrimide with aluminum chloride whereby the resulting anthrimide-carbazole vat dyes may be obtained in comparatively high yields and of high purity.

We have found that, where 1,5-trianthrimide or 1,4-trianthrimide which have the formula:

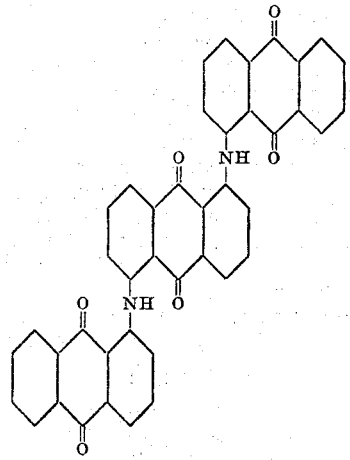

and

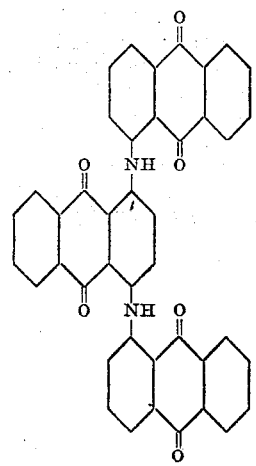

is dissolved in a sodium chloride-aluminum chloride melt at temperatures of from 120° to 160° C. and a small amount of oxidizing agent such as nitrobenzene or meta-nitrobenzene sodium sulfonate is added, the corresponding anthrimide-carbazole dye is obtained in good yields and purity after working up the resulting melt in the usual manner. The fusion is preferably carried out in 5 parts of aluminum chloride and 1 part of salt per part of anthrimide, although the amount of aluminum chloride and salt may be varied within wide limits. The amount of nitrobenzene or meta-nitrobenzene sulfonate that should be employed may vary from 0.25 mol to 1.5 mols per mol of anthrimide. The use of 0.5 mol per mol of anthrimide is preferred. While larger amounts may be employed, any substantial excess over this amount is of no real advantage. When less than 0.25 mol of the oxidizing agent is employed, there is a decided decrease in yield and purity of the resulting dye.

By this process the yield of 1,5-trianthrimide-carbazole is more than doubled over that obtained by the previously disclosed dry fusion methods or by the same process as disclosed herein, wherein the oxidizing agent is omitted and temperatures of 180° to 200° C. are employed. Where the 1,4-trianthrimide-carbazole could not be prepared by the dry fusion in any useful quantities, this new process gives the 1,4-trianthrimide-carbazole of high purity in yields approximately 85% of theory.

Not all oxidizing agents give satisfactory results in this process. It appears that a mild oxidizing agent, that does not liberate oxygen too readily but which will act as an oxidizing agent or hydrogen acceptor under the conditions employed, is the most suitable. Because of the low temperatures employed, which may range from 110° to 160° C., the side reactions which normally occur at higher fusion temperatures are avoided, thereby giving products which are of relatively high purity. The dyestuffs are isolated from the fusion mass and subjected to a mild oxidation reaction by the usual processes employed in preparing anthrimide-carbazole dyestuffs of this class.

The following examples are given to illustrate the invention. The parts used are by weight.

*Example 1*

166 parts of aluminum chloride, 34 parts of salt are melted and, while the melt is held at 130°–135° C., 34 parts of 1,5-trianthrimide are added, after which there are gradually added 6.8 parts of sitol (sodium-m-nitrobenzene-sulfonate). After stirring for one hour, the melt is drowned in water and the mass is filtered. The filter cake is then slurried in 3400 parts of 12% sulfuric acid containing 51 parts of sodium dichromate, and the suspension is held at 90°–95° C. for four hours. The product is filtered off and treated at 90°–95° C. for two hours with 340 parts of 12% sodium hypochlorite in 3400 parts of water.

The dye is obtained as a bright orange paste which requires no further purification in a yield of approximately 70% of theory. It dyes cotton strong orange-yellow shades of excellent fastness and is equal to the purified material formerly obtained in poor yields by the high temperature (200° C.) fusion of 1,5-trianthrimide.

An equivalent amount of nitrobenzene may be substituted for the sitol in this example with equally good results.

*Example 2*

34 parts of 1,4-trianthrimide (readily obtained from 1,4-diaminoanthraquinone and 1-chloroanthraquinone) are added to a melt of 166 parts of aluminum chloride and 34 parts of sodium chloride. While the mass is held at 160° C. there is added 10.2 parts of sitol. After agitating the mass at this temperature for one hour, during which the reaction mass changes in the sulfuric acid solution color from green to olive, it is drowned in water, and after treating with sodium dichromate in dilute sulfuric acid as described in Example 1, the 1,4-trianthrimide-carbazole is obtained directly in a yield of approximately 85% of theory. It dyes cotton very fast shades of brown.

An equivalent amount of nitrobenzene may be substituted for the sitol in this example with equally good results.

We claim:

1. In the process for preparing trianthrimide-carbazole vat dyes of the class consisting of 1,4-trianthrimide-carbazole and 1,5-trianthrimide-carbazole wherein the corresponding trianthrimides are subjected to fusion with aluminum chloride and sodium chloride, the steps which comprise carrying out the fusion at temperatures of from 110° to 160° C. in the presence of from 0.25 mol to 1.5 mols per mol of anthrimide of an oxidizing agent of the class consisting of nitrobenzene and its meta sodium sulfonate.

2. In the process for preparing 1,5-trianthrimide-carbazole wherein the corresponding trianthrimide is subjected to fusion with aluminum chloride and sodium chloride, the steps which comprise carrying out the fusion at temperatures of from 110° to 160° C. in the presence of from 0.25 mol to 1.5 mols per mol of anthrimide of an oxidizing agent of the class consisting of nitrobenzene and its meta sodium sulfonate.

3. In the process for preparing 1,4-trianthrimide-carbazole wherein the corresponding trianthrimide is subjected to fusion with aluminum chloride and sodium chloride, the steps which comprise carrying out the fusion at temperatures of from 110° to 160° C. in the presence of from 0.25 mol to 1.5 mols per mol of anthrimide of an oxidizing agent of the class consisting of nitrobenzene and its meta sodium sulfonate.

WILLIAM DETTWYLER.
FREDERIC B. STILMAR.